(12) United States Patent
Dias et al.

(10) Patent No.: US 8,856,181 B2
(45) Date of Patent: Oct. 7, 2014

(54) SEMANTIC MATCHING

(75) Inventors: Javana Dias, San Francisco, CA (US);
Simon G. Handley, Palo Alto, CA (US);
Ann J. Hunt, Palo Alto, CA (US); To H. Kim, Saratoga, CA (US)

(73) Assignee: First Retail, Inc., Saratoga, CA (US)

( * ) Notice: Subject to any disclaimer, the term of this patent is extended or adjusted under 35 U.S.C. 154(b) by 0 days.

(21) Appl. No.: 13/179,453

(22) Filed: Jul. 8, 2011

(65) Prior Publication Data
US 2013/0013645 A1 Jan. 10, 2013

(51) Int. Cl.
*G06F 7/00* (2006.01)
*G06F 17/30* (2006.01)

(52) U.S. Cl.
CPC .............................. *G06F 17/30734* (2013.01)
USPC ............................ 707/794; 707/749; 707/777

(58) Field of Classification Search
USPC .................................. 707/794, 999.003, 749
See application file for complete search history.

(56) References Cited

U.S. PATENT DOCUMENTS

| | | | | |
|---|---|---|---|---|
| 6,523,026 B1 * | 2/2003 | Gillis | ................................... | 1/1 |
| 6,742,003 B2 * | 5/2004 | Heckerman et al. | ........... | 398/189 |
| 7,328,209 B2 * | 2/2008 | Das et al. | .............................. | 1/1 |
| 7,472,121 B2 * | 12/2008 | Kothari et al. | ........................ | 1/1 |
| 7,640,220 B2 * | 12/2009 | Acharya | .......................... | 706/45 |
| 7,855,811 B2 * | 12/2010 | Silverbrook et al. | ......... | 358/403 |
| 8,386,490 B2 * | 2/2013 | Jiang et al. | ..................... | 707/739 |
| 8,468,160 B2 * | 6/2013 | Hassanzadeh et al. | ....... | 707/748 |
| 8,468,163 B2 * | 6/2013 | Gupta et al. | .................. | 707/758 |
| 2006/0036633 A1 * | 2/2006 | Chong et al. | .................. | 707/101 |
| 2010/0057762 A1 * | 3/2010 | Hatami-Hanza | .............. | 707/101 |
| 2010/0131516 A1 * | 5/2010 | Jean-Mary | ..................... | 707/749 |
| 2010/0161601 A1 * | 6/2010 | Gruber | .......................... | 707/736 |
| 2010/0281061 A1 * | 11/2010 | Chen | ............................. | 707/794 |
| 2010/0332465 A1 * | 12/2010 | Janssens et al. | ............. | 707/722 |
| 2011/0040766 A1 * | 2/2011 | Robinson et al. | ............. | 707/749 |
| 2011/0078698 A1 * | 3/2011 | Lee et al. | ...................... | 718/104 |
| 2011/0087670 A1 * | 4/2011 | Jorstad et al. | ................. | 707/741 |

* cited by examiner

*Primary Examiner* — Miranda Le
(74) *Attorney, Agent, or Firm* — Trellis IP Law Group, PC

(57) ABSTRACT

In a method, system, and computer-readable medium having instructions for semantic matching, a configuration for one or more ontologies is determined with an ontology that has one or more concepts and a representation for the one or more concepts, and the configuration has an assignment of concepts to positions and one or more relationships between concepts in accordance with the representation. The configuration is optimized in accordance with one or more constraints, and a constraint has a relationship defined in a representation for an ontology and a judgment on a similarity of a plurality of concepts from the one or more ontologies, and an estimate is calculated for a similarity between a first concept and a second concept using the configuration.

18 Claims, 7 Drawing Sheets

SEMANTIC MATCHING

FIELD

One or more implementations relate generally to semantic matching in a computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Accurate retrieval of semantically similar objects has become increasingly more complex due to the sheer number of semantically described objects necessary for comparison with a particular object in order to find semantically similar objects and the numerous approaches to defining the objects. Additionally, there are a variety of possible formats for the descriptions of objects and organizational models to reference from providers of the objects which adds to the complexity. The complexity increases as the number of objects and the number of different organizational models for the objects grows.

For example, it has become difficult for a reseller to retrieve semantically similar objects when similar objects are described differently by each provider, and each provider may have completely different organizational model for grouping of the objects. Continuing with the example, a reseller may need to return results for a search query with an object described as "plasma tv" and an object of "tv" with the attribute of "plasma" and the information for the objects could be modeled in two entirely different organizational structures.

The retrieval of accurate information and subsequent delivery of semantically similar objects to the user system has been and continues to be a goal of search and/or knowledge management systems in a computing environment. The ability to scale well in light of the number of objects and comparisons necessary has been and continues to be a goal for approaches to retrieval of semantically similar objects. Accordingly, it is desirable to provide techniques to improve the accuracy of semantic matching methods that scales well in a computing environment.

BRIEF SUMMARY

In accordance with embodiments, there are provided mechanisms, systems, computer readable mediums, computer program products, and methods for semantic matching.

In an embodiment and by way of example, a method, system, and computer-readable medium for semantic matching are provided. In a method, system, and computer-readable medium having instructions for semantic matching, a configuration for one or more ontologies is determined with an ontology that has one or more concepts and a representation for the one or more concepts, and the configuration has an assignment of concepts to positions and one or more relationships between concepts in accordance with the representation. The configuration is optimized in accordance with one or more constraints, and a constraint has a relationship defined in a representation for an ontology and a judgment on a similarity of a plurality of concepts from the one or more ontologies, and an estimate is calculated for a similarity between a first concept and a second concept using the configuration.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1A:
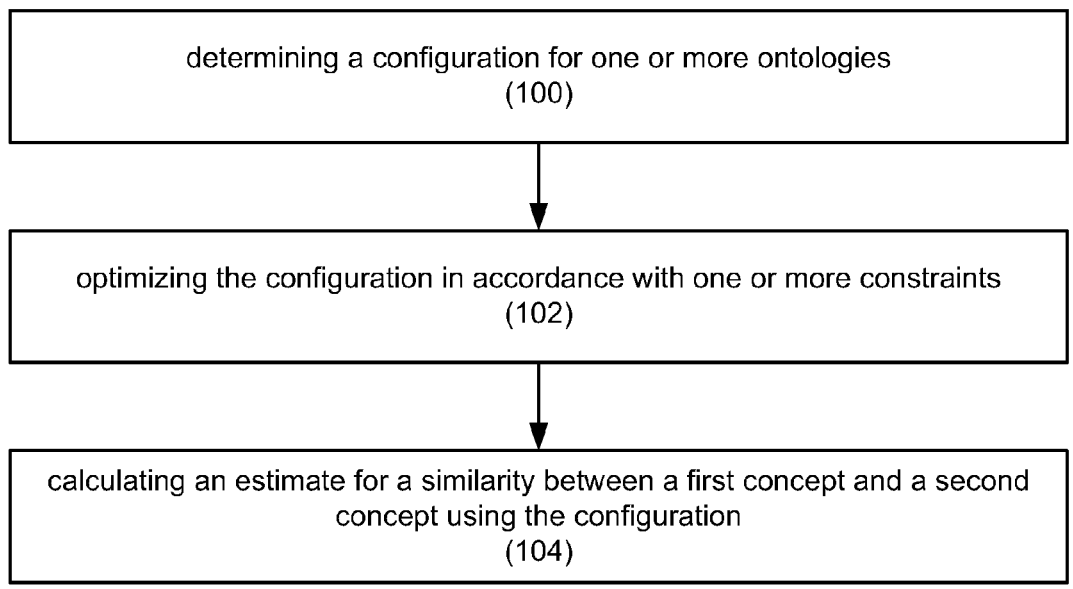
FIG. 1A illustrates an example of a simplified flow diagram for an embodiment of semantic matching on one or more computer systems.

Systems, mechanisms, computer readable mediums, computer program products, and methods are provided for semantic matching. Semantic matching may be performed to identify information, objects, concepts, or any other data that is semantically related, refers to the same underlying concept, and/or similar. A semantic matching request may be received and any number of semantically similar concepts may be identified in response to the request. For example, a "car" may be semantically similar to an "automobile." In another example, a "toaster oven with at least 1000 W power" may be a semantically similar concept to "BrandX Toast-R-Oven 4-Slice Toaster Oven" and "BrandY Convection Toaster Oven."

In one or more embodiments, a global ontology may be created to serve as a reference in handling requests for determining whether concepts and/or objects are semantically similar. For example, a query may be received with a request to determine whether a first concept is similar to a second concept and the global ontology may be used as a reference to determine the similarity between the concepts. The global ontology may be computed from and/or represented with a configuration. The configuration may be created from data or information from one or more ontologies and serve as a representation for the one or more ontologies. The configuration may represent the ontologies with a set of positions for the one or more concepts from the one or more ontologies in a metric space.

In an embodiment, a potential momentum and/or potential energy may be associated with each concept in the configuration. The potential energy function may be determined from the set of concepts, the set of ontological relations between concepts (e.g. subclass, disjoint, or any other type of relation), and/or the similarity judgments. Data or information may be received on at least a portion of one or more ontologies (e.g. a concept or a schema) and the configuration for the global ontology may be created or updated with the received information.

The data associated with the configuration, set of positions in a metric space, and/or set of locations in a metric space may be distributed over one or more computer systems, such that the global ontology may consist of many configurations or portions of configurations that are instantiated on one or more computer systems. A programming construct of a class (e.g. instantiated as a programming construct of an object) may be instantiated for each concept in the configuration, such as in a tree or graph data structure in an implementation. Metadata for the set of positions of the configuration may be contained on one or more computer systems and a data structure for a configuration or portion of a configuration may be instantiated as needed. Embodiments may use the metadata for the configuration to determine semantically similar concepts without implementing a data structure for the configuration.

An ontology may be any representation or description that defines one or more individual concepts, one or more classes of concepts, and/or any number of relations among the concepts. The ontology may provide a hierarchy, a schema, a structure, or any other representation that defines the relationships between the one or more concepts. The term "hierarchy" may be any representation that defines the relationships between the one or more concepts, and the terms "hierarchy" and "representation" may be used herein interchangeably throughout.

A concept is a cognitive unit of meaning, such as an abstract idea or unit of knowledge, built from other units (e.g. data) which act as a concept's characteristics. The concept may be a class of concepts, an individual concept, a node, an object, and/or any other type of entity. A class of concepts may be a set of one or more individual concepts. Concepts may be created to represent any data, idea, object, and/or domain. For example, concepts may be created for commercial transactions, bartering, products, services, or any other data. Concepts may have associated attributes, various features, and restrictions.

An ontology may have a set of instances of classes (e.g. groups of individual concepts) that may serve as a knowledge base. For example, an instance of a class of wines (e.g. red wine) in an ontology may represent a group of all red wines, and a specific wine (e.g. a glass of Bordeaux) may be an instance of an individual concept. A class of concepts may itself be a concept that serves as a description for a group of individual concepts in a domain. As such, the terms "class" and "concept" may be used interchangeably throughout.

The global ontology may be a configuration that satisfies one or more ontological hierarchies and/or ontological structures (e.g. one or more ontologies). The ontological hierarchies or ontological structures may express the relationships between the concepts and map the relationships between the one or more concepts. Metadata on the concepts from the one or more ontologies and the assignment of concepts to positions in metric space may be stored for creation of the configuration. In an embodiment, the global ontology may be viewed as consisting of one or more objects or instances of the concepts described in a schema for an ontology.

In one or more embodiments, relationships between concepts in the configuration may be formed based upon one or more judgments on the similarity of concepts within the global ontology. The terms "judgment on a similarity" and "similarity judgment" may be used interchangeably throughout. An initial assignment of the concepts to positions in metric space may position the concepts in space to reflect the anticipated similarity between the concepts and/or a hierarchy. The relationships based upon the hierarchies and similarity judgments may be noisy, inconsistent, and/or not verified for accuracy. Optimization may be performed to adjust the configuration of the concepts in accordance with one or more constraints provided by the hierarchy of the ontologies and the given similarity judgments.

It may be desirable to view a global ontology for solving a semantic matching problem as respecting some of the same principles found in nature that are used for solving a molecular dynamics problem. As such, it may be desirable to view handling those same principles with methods and/or a mapping of a semantic matching problem to a conceptual framework as an application of how the principles are handled with a framework that is used in solving a molecular dynamics problem. In an embodiment, the use of a global ontology may be viewed as a mapping of a semantic matching problem to an energy minimization molecular dynamics problem and/or an application of aspects of handling an energy minimization molecular to a semantics matching problem. However, those with skill in the art will recognize that a molecular dynamics problem is the modeling of a physical protein whereas the use of a global ontology is a symbolic model for concepts.

By way of example, in a molecular dynamics problem, a set of positions of atoms in metric space for a protein may be initially provided and the positions may be altered to minimize the energy between the atoms of the protein. In nature, force is inversely proportional to distance, such that atoms nearby only need to be considered during analysis and atoms that are far away may be largely ignored. Molecular dynamics energy minimization problems involve solving large numbers of partial differential equations simultaneously or in parallel on one or more computer systems to analyze atoms of proteins. To solve a molecular dynamics problem, a group of atoms may be assigned to a particular machine for analysis based on the group's proximity to a particular atom or particular atoms. This grouping of atoms for minimization on computer systems allows for simultaneous processing for minimization of the energy for the protein.

In an embodiment of solving a semantic matching problem, the concepts nearby particular concepts may be weighted more heavily during optimization than those positioned relatively farther away in observance of the same principle found in nature. Continuing with the embodiment, the concepts close in proximity to each other may be assigned to the same computer systems for optimization and/or computation of area for concepts. Concepts located relatively close to concepts may be weighted more heavily than the concepts that are relatively far apart, during optimization. Those with skill in the art will recognize that atoms have set and have defined properties (e.g. hydrogen is attracted to oxygen) that are fixed and will not change over time and/or are not noisy (e.g. inconsistent). In an embodiment of semantic matching, concepts that are consistently found to be similar and/or found in ontological hierarchies may be grouped together on one or more computer systems for optimization of the configuration.

In another example, the distance between two atoms in a molecular dynamics problem that are highly attracted to each other and are located in the immediate area may be reduced to minimize the potential energy for the protein. In one or more embodiments, the interactions between concepts in a configuration of the global ontology are analyzed to reduce the "energy" caused by the positioning of concepts in the configuration. For a pair of concepts, it may be desirable to view the energy as "high" in semantic matching if two similar concepts are positioned relatively far from each other in the configuration, and the configuration may be optimized to reduce the "energy" created by keeping two highly similar concepts separated.

Next, systems, mechanisms, computer readable mediums, computer program products, and methods are provided for semantic matching that will be described with reference to example embodiments.

FIG. 1 illustrates an example of a simplified flow diagram for an embodiment of semantic matching on one or more computer systems. A configuration may be determined for one or more ontologies (100). Each of the one or more ontologies may be any representation that defines one or more concepts and/or a hierarchy or a structure that defines the relationships for the one or more concepts. The concepts may be viewed as "semantified" or semantically described. In one or more embodiments, the ontology may be a schema, including, but not limited to, a Resource Description Framework (RDF)-Schema, Web Ontology Language (OWL)-Lite, and/or OWL-Description Logic (DL).

The ontology may have a structure or a representation that indicates any sort of relationship between concepts, such as, but not limited to, a hierarchy that may indicate a parent-child relationship, a sibling relationship, subclass-superclass relationship, and/or provide any other relationship between concepts. In an embodiment, the ontology may represent a particular domain or subject matter and provide information on a set of concepts within that domain. For example, the ontology may have concepts that represent all of the products from a particular company or supplier.

Information may be received on the one or more ontologies and a configuration for the concepts in the one or more ontologies may be determined. Information received (e.g. an OWL graph or other schema) may be provided in a variety of ways, including, but not limited to use of a computer program, a user interface, and/or entity extraction from natural language.

Figure 1B:
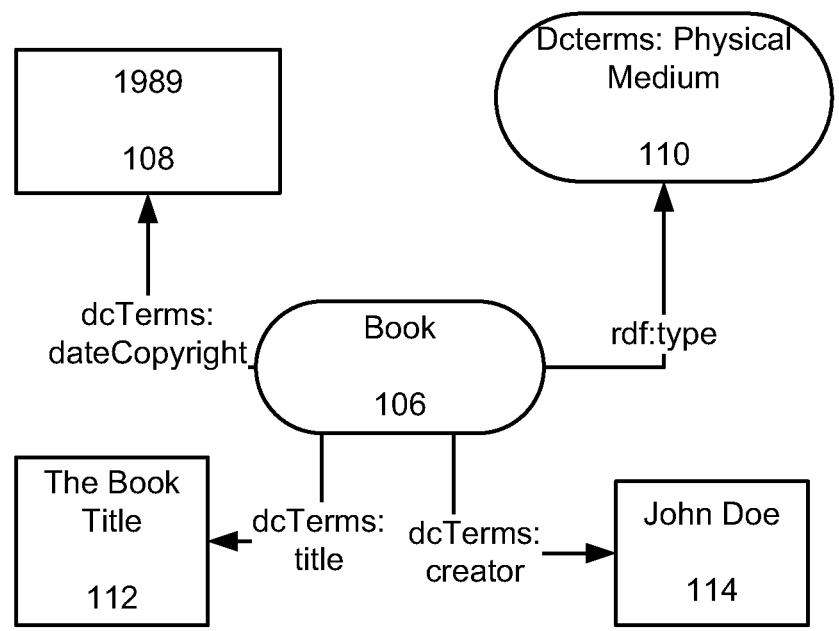
FIG. 1B illustrates an example of a concept in a schema for an embodiment of semantic matching on one or more computer systems.

FIG. 1B illustrates an example of a concept in a schema for an embodiment of semantic matching on one or more computer systems. In an embodiment, a concept as illustrated in FIG. 1B may be extracted from a schema with an API and a single point of reference to the concept (e.g. use a singleton design pattern) may be returned or provided using the API. In another embodiment, a schema may be provided with one concept as illustrated. In FIG. 1B the "Book" concept 106 is related to one or more concepts, as illustrated a copyright date "1989" 108, a property type for the Book 106 of "dcterms: Physical Medium" 110, a book title "The Book Title" 112, and a creator author "John Doe" 114. Each of the concepts may have relationships with the "Book" concept 106.

The configuration may define an assignment of positions for one or more concepts in a metric space and one or more relationships between the concepts. The configuration may be the assignment of positions to concepts, such as the assignment to individual concepts and the assignment to classes of concepts. Continuing with the example, in FIG. 1B, "Book" concept 106 would be mapped with all of the relationships to concepts: "1989" 108, "The Book Title" 112, and "John Doe" 114. In an embodiment, the initial set of positions for the concepts in metric space may be an assignment of position for the concepts in metric space such that their distance reflects the initial expectation of similarity and/or hierarchy. In another embodiment, an assignment of a position may be stored for the concept in metadata and the concept does not have to be instantiated in a configuration in space to become part of the configuration. In yet another embodiment, one or more of the concepts may be arbitrarily assigned positions in a metric space.

In an embodiment, the concept itself may represent a relationship between concepts. The concept may have properties that describe or define the concept and/or the concept may have relationships with one or more concepts in accordance with the hierarchy. For example, the concept "television" may have a property of size "small" and relationships with the concept "plasma" and the concept "brandX."

Metadata on the configuration (e.g. assignment of positions of the concepts) and the concepts may be stored in a database. A database is any collection of data, including, but not limited to a relational database, an object-oriented database, or a file system. In an embodiment, the metadata on a particular set of positions may be retrieved to create redundant configurations and/or portions of the global ontology on one or more computer systems.

In an embodiment, information or data received on the one or more ontologies may be in different formats and/or different schema formats. The information on the ontologies may be converted into a single format for semantic matching. For example, an ontology may be received in OWL-Lite and converted to a RDF-Schema format.

The configuration may represent a portion of a global ontology that may be referenced to handle requests on the similarity between two concepts. The configuration may be distributed and/or subdivided, such that portions of the configuration are instantiated on one or more computer systems. In an embodiment, the configuration may be viewed as instantiations of the individual concepts from one or more ontologies, and the position in metric space assigned to the concept may reflect the relative similarity to other surrounding concepts. For example, a child concept of a concept may be positioned relatively close to the parent concept. In another example, a concept known to be dissimilar to another concept may be positioned relatively far away from the dissimilar concept in the configuration.

Continuing with FIG. 1A, the configuration may be optimized in accordance with one or more constraints (102). A constraint may be a hierarchy provided for an ontology and/or a judgment on a similarity of a plurality of concepts from the one or more ontologies.

The judgment on the similarity of the plurality of concepts from the one or more ontologies may be obtained from methods including, but not limited to, crowdsourcing, mining data, recording a behavioral judgment, using a histogram, using a heuristic, or any other method for decision making on the similarity between two or more concepts. In an embodiment, the judgment on the similarity of the plurality of concepts may be machine generated and human generated. The similarity judgments may be created offline in a batch mode and/or continuously provided throughout execution of semantic matching processes.

A behavioral judgment is a judgment made by a person on whether two concepts are similar. For example, a person may be requested to provide a similarity judgment on two concepts. Crowdsourcing is the outsourcing of a task to a number of persons. In another example, the task of creating similarity judgments may be outsourced to a group of persons to select whether two concepts are similar, such as a group of randomly selected persons. In another embodiment, a user may be queried on whether the results from a semantic match query were accurate and the user's decision on the accuracy may serve as a similarity judgment.

Data mining is the process of extracting patterns from large data sets. In an embodiment, similarity judgments for one or more concepts may be discovered by crawling the Internet and mining the data found to determine pairs of concepts found on website(s), webpage(s), reference websites (e.g. Wikipedia), webpage links found on webpages, and/or webpages linked to a particular webpage may be determined to be similar.

In an embodiment, a degree of certainty that the similarity judgment is accurate may be associated with the similarity judgment. The degree of certainty that a similarity judgment mined from the Internet may be trusted and/or deemed accurate may be based upon the location that the concepts are found on the Internet. For example, if a first concept is found on a webpage linked to a webpage that a second concept is found, then the degree of certainty that the concepts are similar may be less than if the two concepts were found on the same page.

In another embodiment, a reference website or trusted website may be mined to determine similarity judgments and/or to add to the degree of certainty that the similarity judgment is accurate. For example, if a trusted website had two concepts on a webpage and the two concepts are also found on two linked webpages, then the degree of certainty that the similarity judgment may be higher. In an embodiment, the dissimilarity between the two concepts may be recorded as a similarity judgment.

In one or more embodiments, the configuration may be optimized by analyzing the constraints for a plurality or a pair of concepts. As indicated above, it may be desirable to view optimization as finding a stable configuration with a potential function. The optimization may involve solving a set of partial differential equations or performing a simulation. In an embodiment, a Monte Carlo simulation may be used. In a Monte Carlo simulation, every possibility may be considered from a set of possible inputs and the best is chosen. For example, satisfying every possible combination of the one or more constraints may be considered for positioning of the concepts with a Monte Carlo simulation and the best set of positions in accordance with the constraints may be selected. The assignment of positions in the configuration may be adjusted in accordance with the constraints on the pair of concepts. The configuration may be adjusted to minimize any number of conflicts with satisfying the one or more constraints for each pair of concepts during optimization. For example, the position of a concept from the pair may be adjusted in accordance with the majority of constraints (e.g. similarity judgments) and/or one or more trusted constraints.

In an embodiment, a potential energy function may be used to model a large number of constraints and/or the stability of the configuration with the assignment of positions in space. The potential energy function for the configuration represents the energy stored in a system due to the assignment of positions of the concepts in the configuration. The addition of a new concept, a constraint, and/or similarity judgment may change the potential energy of the configuration. The analysis of a concept, constraint and/or similarity judgment not considered in the initial set of positions for the configuration may cause instability in the configuration and change the potential energy of the configuration.

The optimization for semantic matching may be viewed as minimizing the potential energy of the system. For example, concepts that are likely to be similar may be thought of as highly attracted to each other and may be positioned closer in order to "minimize the energy" of the configuration. It may be desirable to view optimization/minimization as reaching an equilibrium found when the set of concepts reaches a low energy state.

In one or more embodiments, the optimization of the configuration may be spatially subdivided and processed on one or more computer systems. Spatial subdivision is the division of the metric space into regions and the processing of the data within each of the regions. The spatial subdivision may be used to divide the metric space of the configuration and each subdivision may be optimized.

Spatial subdivision methods may include, but are not limited to, uniformly subdividing the configuration to regions, quad-tree spatial, or any other method for spatial subdivision. The use of spatial subdivision may allow for increased speed in discovery of neighbors. In a preferred embodiment, the discovery of neighbors may be from O(n) to O(1).

In an embodiment, the subdivisions are non-overlapping regions of the metric space for the configuration. In another embodiment, the subdivisions may be overlapping. For example, the subdividing may be performed such that there is sufficient redundancy for the failure of one or more computer systems. Continuing with the example, a threshold may be provided for when to fork off a new process on another computer system to instantiate, store, optimize, and/or analyze data for at least a portion of an ontology. The metric space may be subdivided and then optimization process for each subdivision may be assigned to a computer system within a cluster of computer systems. A cluster is a group of loosely coupled computers that work together closely.

In a preferred embodiment, the use of spatial subdivision and the grouping of concepts that are positioned relatively near each other in subdivisions for performing semantic matching on one or more computer systems may allow for scaling on computer systems with minimal space and intercommunication requirements. Continuing with the preferred embodiment, for an input size of n, the computation average is O(log n) or O(n log n). In an embodiment, general purpose computers with may be configured to be a particular computer for semantic matching including, but not limited, any of the following: lossy interconnects or network connections, memory, and/or small hard discs. In another embodiment, semantic matching may be performed with any number of servers. Semantic matching may be offered as software as a service in the "cloud" in an embodiment.

An estimate may be calculated for a similarity between a first concept and a second concept using the configuration (104). The area for the regions of the first and second concept may be computed and a similarity estimate for the first and second concepts may be calculated. Spatial subdivision may be used to divide the configuration and compute the regions for the area of the concepts.

In an embodiment, an estimate for the similarity is calculated, as follows:

$$\text{similarity}(C_1, C_2) = \frac{\text{area}(C_1 \cap C_2)}{\text{area}(C_1 \cup C_2)}$$

where $C_1$ is the first concept, and $C_2$ is the second concept. Two concepts that are similar will have an estimated similarity closer to 1 and two concepts that are less similar may be closer to 0.

In one or more embodiments, the area may be calculated for each concept using calibration. In a preferred embodiment, calibration involves taking a region of a concept or a prediction for a region of a concept and placing another concept in the region to observe the attraction, the repulsion, and/or change in "energy" experienced with the placement of the new concept within the region.

Figure 2:
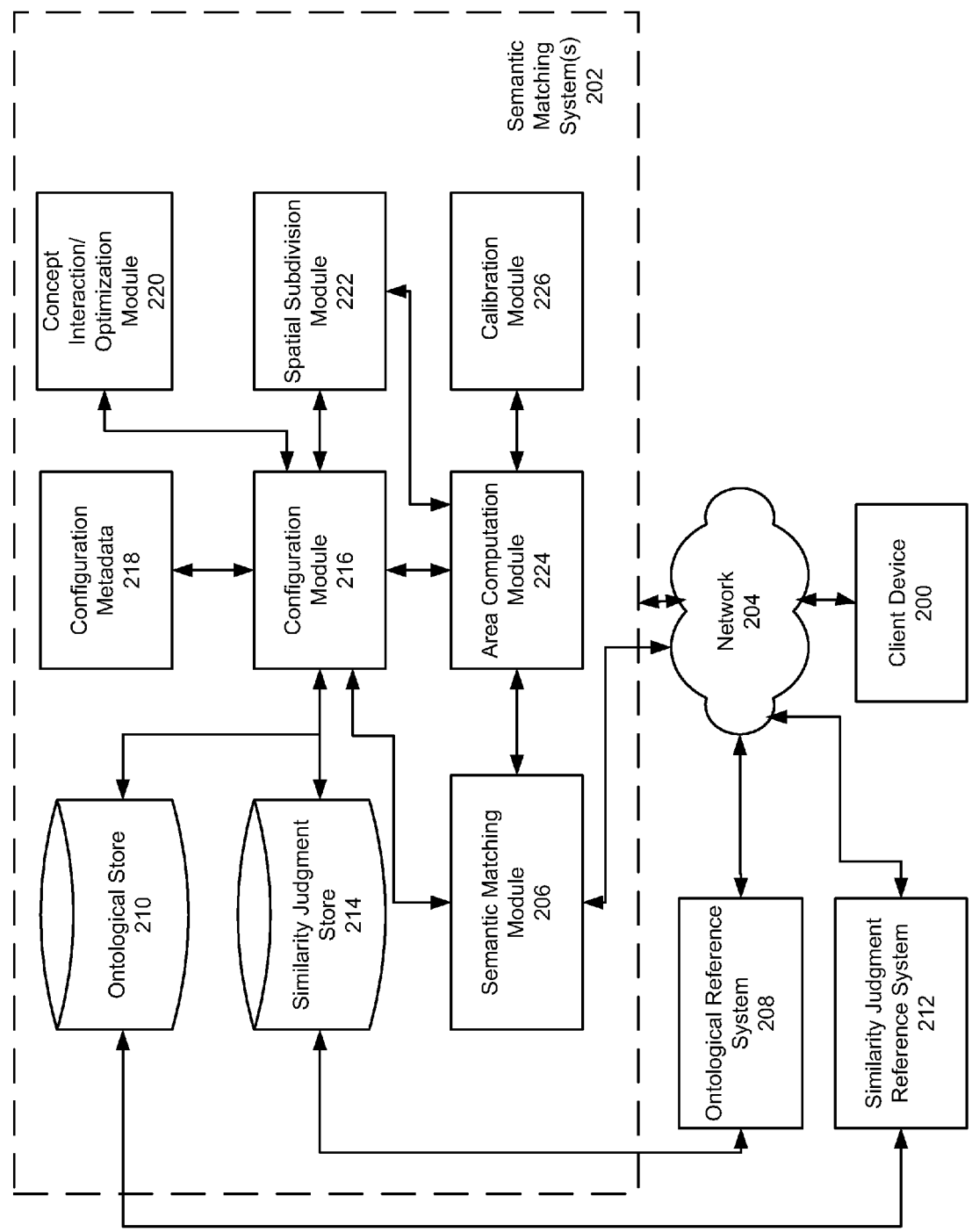
FIG. 2 illustrates an example of a system for semantic matching in an embodiment.

FIG. 2 illustrates an example of a system for semantic matching in an embodiment. In one or more embodiments, a Client Device 200 may send requests to one or more Semantic Matching System(s) 202 over a Network 204. For example and without limitation, this can include sending a request to a Semantic Matching Module 206. The Semantic Matching Module 206 may provide an Application Programming Interface (API) that can handle requests for finding one or more semantic matches for a concept and/or a semantically described object. In an embodiment, the Client Device 200 may have an application executing on the device that makes semantic matching requests. In another embodiment, the Client Device 200 may send a search query request for concepts that are most similar to one or more search terms, and the Semantic Matching Module 206 may make one or more semantic matching API calls to handle the search request.

Client Device 200 may include, but is not limited to, a mobile device, a smart phone, an Apple iPhone™, a cellular phone, a BlackBerry® device, a personal digital assistant (PDA), a mp3 player, a laptop, a computer, or any other type of computer system. In another embodiment, a Semantic Matching System 202 may be a standalone application on a computer system. In another embodiment, the Client Device 200 may have a browser-based application and the Semantic Matching System(s) 202 may be remote to the Client Device 200.

Although Semantic Matching System(s) 202 may be referred to as the Semantic Matching System 202 herein, the Semantic Matching System 202 may have components and/or processes executing on one or more computer systems. As will be appreciated by those skilled in the art, the functional elements of Semantic Matching System 202 as illustrated in FIG. 2, are provided as an example, and various implementations of the system may have subsets of the functional elements and/or subsets may be distributed amongst various computer systems.

One or more Ontological Reference System(s) 208 may provide one or more ontologies or portions of ontologies for reference in creation of the configuration and the information on the ontologies may be stored in an Ontological Store 210. One or more Similarity Judgment Reference System(s) 212 may provide similarity judgments to optimize the configuration, and the similarity judgments may be stored in a Similarity Judgment Store 214. The Similarity Judgment Store 214 and Ontological Store may be implemented as databases or any other collection of data.

The Configuration Module 216 may be used to create and manage the configuration. The Configuration Module 216 may use information on one or more ontologies and one or more similarity judgments for the configuration. Configuration Metadata 218 may have the configuration information. The Configuration Module 216 may use a Concept Interaction/Optimization Module 220 to analyze the concepts within the configuration and optimize the configuration in accordance with the ontologies and similarity judgments.

A Spatial Subdivision Module 222 may be used to subdivide the configuration into one or more regions or subdivisions to calculate the area of a concept and/or optimize the configuration. The Area Computation Module 224 may be used to calculate and/or estimate the area of a region in metric space for a concept. A Calibration Module 226 may be used to calibrate an estimate for the area of a concept.

The Network 204 is any network or combination of networks of devices or computer systems that communicate with one another. For example, network 204 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet." Those with skill in the art will recognize that the networks that the present invention might use are not so limited, although TCP/IP is a frequently implemented protocol.

Client Device 200 might communicate with Semantic Matching System 202 using TCP/IP and, at a higher network level, use other common Internet protocols to communicate, such as HTTP, FTP, AFS, WAP, etc. In an example where HTTP is used, Client Device 200 might include an HTTP client commonly referred to as a "browser" for sending and receiving HTTP messages to and from an HTTP server or web server at Semantic Matching System 202. In one or more implementations, the interface between Semantic Matching System 202 and Network 204 includes load sharing functionality, such as round-robin HTTP request distributors to balance loads and distribute incoming HTTP requests evenly over a plurality of servers or Semantic Matching System(s) 202.

Figure 3:
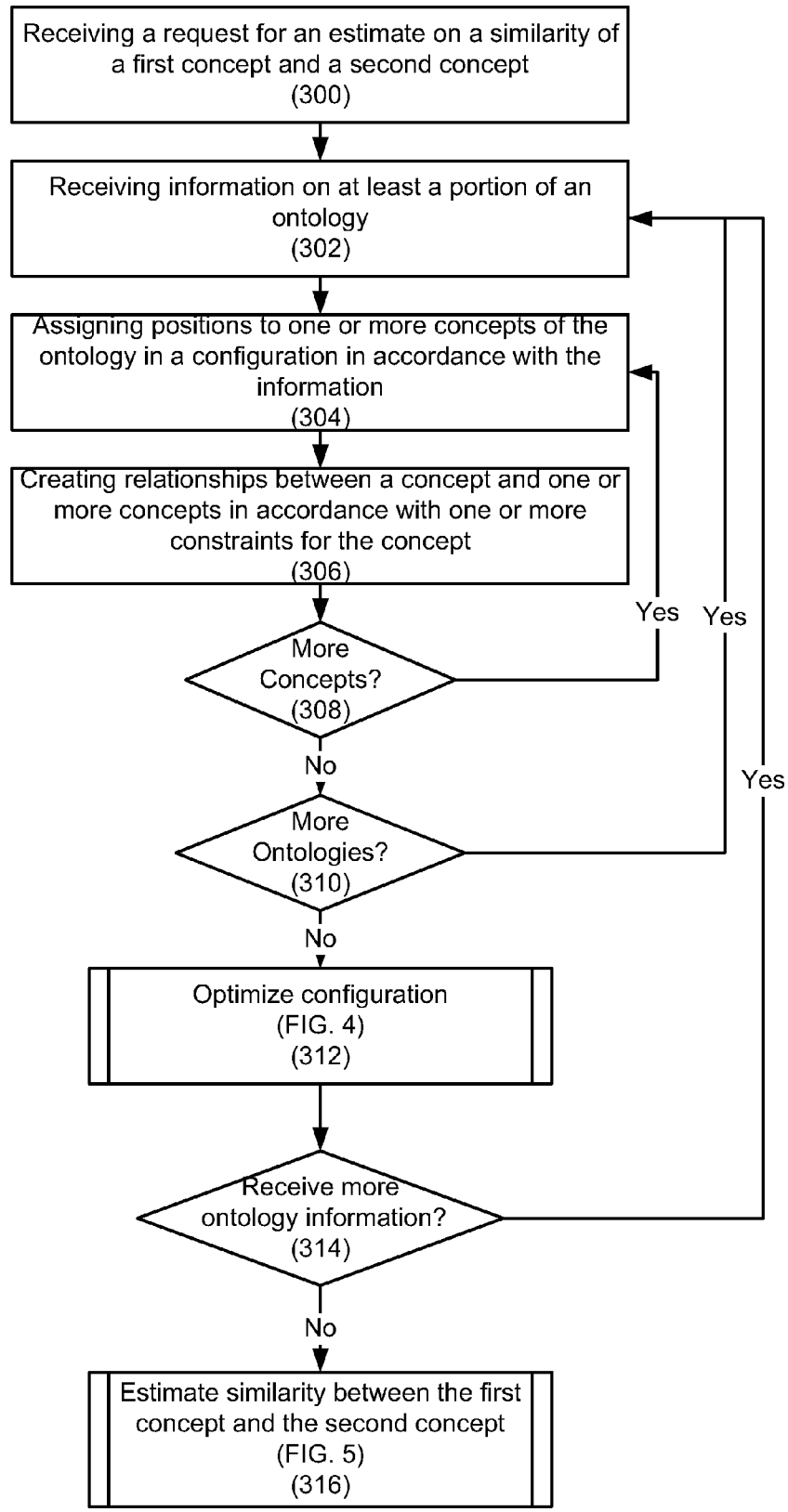
FIG. 3 is an operational flow diagram illustrating a high level overview of a technique for semantic matching in an embodiment.

FIG. 3 is an operational flow diagram illustrating a high level overview of a technique for semantic matching in an embodiment. A request may be received on the similarity of a first and second concept (300). The request may be received from a Client Device 200 over the Network 204 to the Semantic Matching System(s) 202. In another embodiment, the request may be made as result of an API call from the Semantic Matching Module 206. In a preferred embodiment, a query request may contain an OWL class expression for discovery of concepts similar to the given OWL class expression.

Information on at least a portion of an ontology may be received (302). Information may be received on one or more complete ontologies, an update to one or more ontologies, or a portion of one or more relevant ontologies. In a preferred embodiment, updates to the ontologies for the configuration may be continuously updated over time. The information for the ontologies may be in the form of a schema and have a hierarchy for one or more concepts. Information on the one or more ontologies may also be one or more similarity judgments for concepts. The hierarchy for an ontology or portion of an ontology and the similarity judgments may be constraints for the configuration.

One or more concepts of the ontology may be assigned positions in metric space for the configuration in accordance with the information (304). The configuration may define an assignment of positions in a metric space to the one or more concepts from one or more ontologies. In a preferred embodiment, the configuration is an assignment of positions or locations of one or more concepts in a two dimensional metric space.

In an embodiment, the assignment of and/or placement of concepts in the configuration may be based, at least partially, on a proximity measure. An example of a formula for a proximity measure to select an assignment of a position for a concept in metric space for the configuration is, as follows:

$$f(d) = \frac{1}{1 + e^{M(d-B/2)}}$$

where M is a scaling factor that scales f(d) larger in proportion to M, B is a translational factor that moves the sigmoid closer or further away from zero, d is the (absolute) distance between two concepts, and f(d) varies from a large positive number $$\left(\frac{1}{1 + e^{-MB/2}}\right) \text{ as } d \to 0,$$

to 0.5 when d=B/2, to 0 as d→Inf. Continuing with the example, the proximity of two concepts, X and Y, is inversely proportional to f (∥X−Y∥). In an embodiment, the formula may be a logistic function inverted around x=0, translated so that the mid-point is at x=B, and scaled so that the maximum value of f(d) is M (at d=−Inf). A logistics function or logistics curve may be a sigmoid curve that may model a population (e.g. of concepts) with initial exponential growth that gradually slows as the population matures. Those with skill in the art will recognize that this is one example of a proximity measure and that there are other proximity measures, such as other formulas for a logistic function or a logistic curve, which may be used to select an assignment for a position.

Relationships may be created between a concept and one or more concepts in accordance with one or more constraints for the concept (306). The constraints from the hierarchy of an ontology and/or a similarity judgment may determine the relationships created and/or modified in the configuration for the concept.

A determination may be made as to whether there are any more concepts from one of the ontologies from the received information that have not been mapped in the configuration (308). If there are more concepts to be mapped, then the next concepts are mapped (304) and the process continues.

Alternatively, if there are no more concepts to map from an ontology from the received information (308), then a determination is made as to whether there are more ontologies (310) from the received information. If there are more ontologies (310), then the information on the next ontology is received (302) and the process continues.

Alternatively, if there are no more ontologies from the received information that need to be mapped, then the configuration is optimized (312). Optimization of the configuration will be described in more detail below with FIG. 4.

A determination may be made as to whether more information has been received (314). Information on the ontologies, similarity judgments, and constraints on the configuration may be received continuously in an embodiment and the configuration may be updated to reflect the changes. In one or more embodiments, a determination may be made as to whether the received information is pertinent to the configuration or portion of the configuration instantiated on a particular computer system. In another embodiment, processing of received information may be delayed while the Semantic Matching System 202 performs other functions.

If a determination is made to process the received information (314), then the information is received for processing (302) and the process repeats.

Alternatively, if a determination is made that no more pertinent information has been received or not to process the ontology information (314), then an estimate on the similarity between the first concept and second concept is determined (316). Estimation of a similarity between the first concept and second concept is described in more detail below with FIG. 5.

Figure 4:
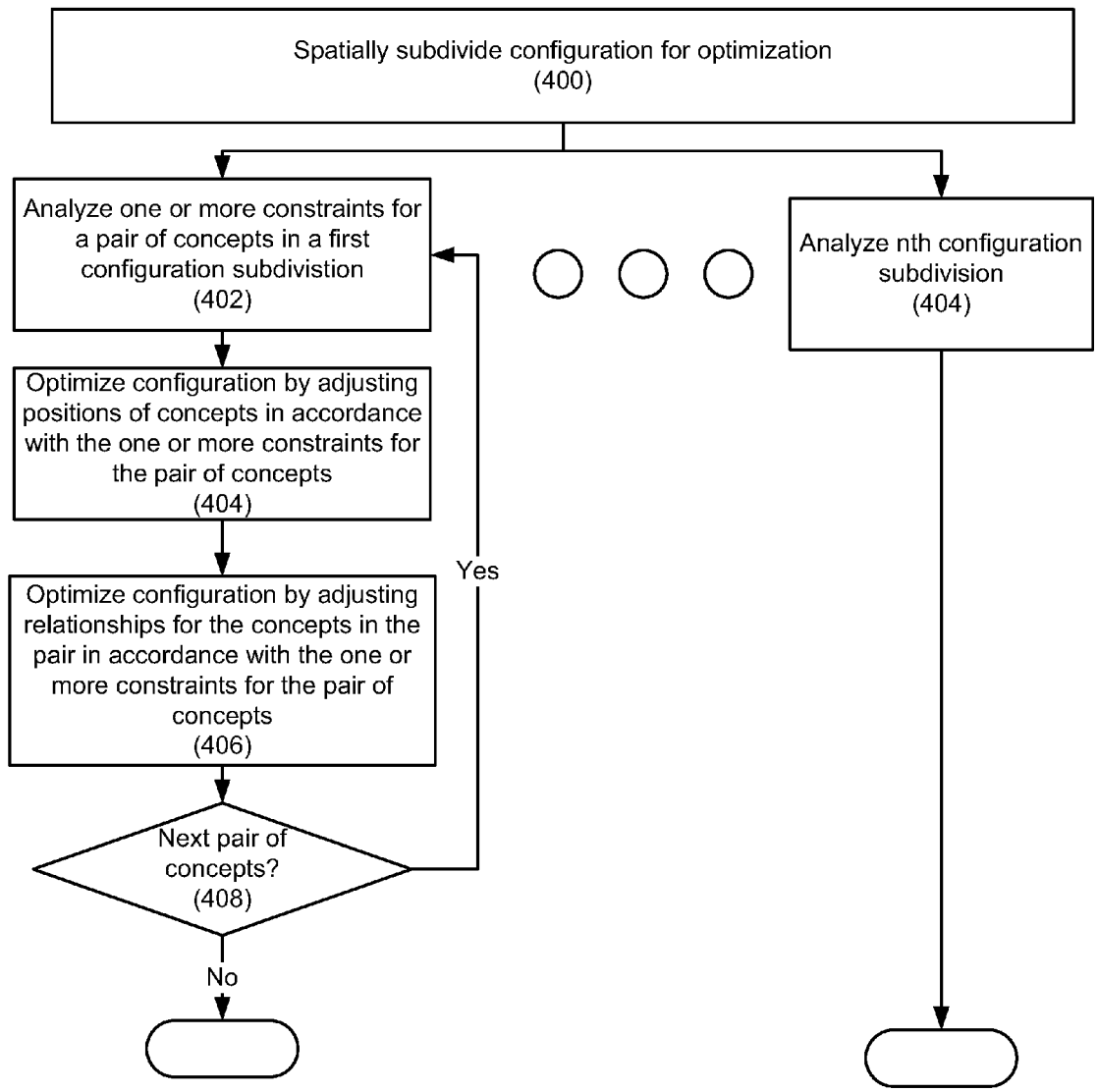
FIG. 4 is a detailed flow diagram illustrating an overview of a technique for semantic matching in an embodiment.

FIG. 4 is a detailed flow diagram illustrating an overview of a technique for semantic matching in an embodiment. In an embodiment, the configuration may be spatially subdivided for optimization (400). The metric space of the configuration may be subdivided into regions and the processing of the data within each of the regions may be performed in parallel, consecutively, and/or on different computer systems. As illustrated, optimization is performed for 1 . . . N subdivisions. For example, optimization for the first configuration subdivision begins (402) and optimization for the nth configuration subdivision begins (404).

Optimization may begin with analyzing one or more constraints for a pair of concepts in a first configuration subdivision (402). A concept in a subdivision may be compared pair-wise with each concept within the subdivision. The interactions and/or constraints between the concepts in the pair may be analyzed.

In an embodiment, a measure of "surroundedness" may be used to define or determine the pair-wise interactions between concepts, and may be used to determine a region for a concept. For example, a formula for how surrounded a concept P is by another concept C is, as follows:

$$V_{sub}(x, P, C) = [x \in C]f_P(x) \sum_{\text{concept } x' \neq x} [x' \in P]\frac{1}{\|x - x'\|}$$

In another example, taking in to consideration the equal and opposite forces of Newton's Third Law, a formula for how surrounded a concept P is by another concept C may be defined as follows:

$$V_{sub}(x, P, C) = [x \in P] \sum_{\text{concept } x' \neq x} [x' \in C]\frac{f_P(x')}{\|x - x'\|}$$

In an embodiment, each $V_{sub}$ (x, P, C) describes how the total potential energy function, V( ), is created out of sub-potential functions that account for various constraints being satisfied. Here, $V_{sub}$ (x, P, C) indicates that concept x should interact with another concept x' when x' is a member of concept P in the indicated fashion (e.g. inversely proportional to distance). Newton's third law states that for every action (force) in nature there is an equal and opposite reaction. A definition for Newton's third law may be found in "Physics for Scientists and Engineers, Volume 5", Raymond A. Serway, John W. Jewett, Cengage Learning, 2009, pp 110-1, incorporated by reference herein.

The configuration may be optimized by adjusting the positions in metric space for concepts in accordance with the one or more constraints for the pair of concepts (404). The constraints may indicate that the positioning in the metric space relative to each other may need to be adjusted. Alternatively, analysis of the constraints may indicate that the position of the concepts does not need to be adjusted.

The configuration may be optimized by adjusting relationships for the concepts in the pair in accordance with the one or more constraints for the pair of concepts (406). The constraints may indicate that the relationships in the configuration for the concepts in the pair may need to be adjusted. Alternatively, analysis of the constraints may indicate that the relationships for the pair of concepts do not need to be adjusted.

A determination is made as to whether there is a next pair of concepts in the subdivision to be analyzed (408). If there are more pairs to analyze (408), then the process repeats (402).

If there are no more pairs to analyze (408), then the process for optimization for that subdivision may end. The optimization process may continually occur for the configuration over time as new constraints are introduced and/or updated.

In a preferred embodiment, symbolic differentiation and simplification may be used to optimize the potential energy function whose symbolic form may dictate one or more optimal configurations. In a preferred embodiment using simulation, finite step integrators (e.g. Verlet, Velocity Verlet, Beeman's R-K), adaptive time-stepping, and integration may be used.

Figure 5:
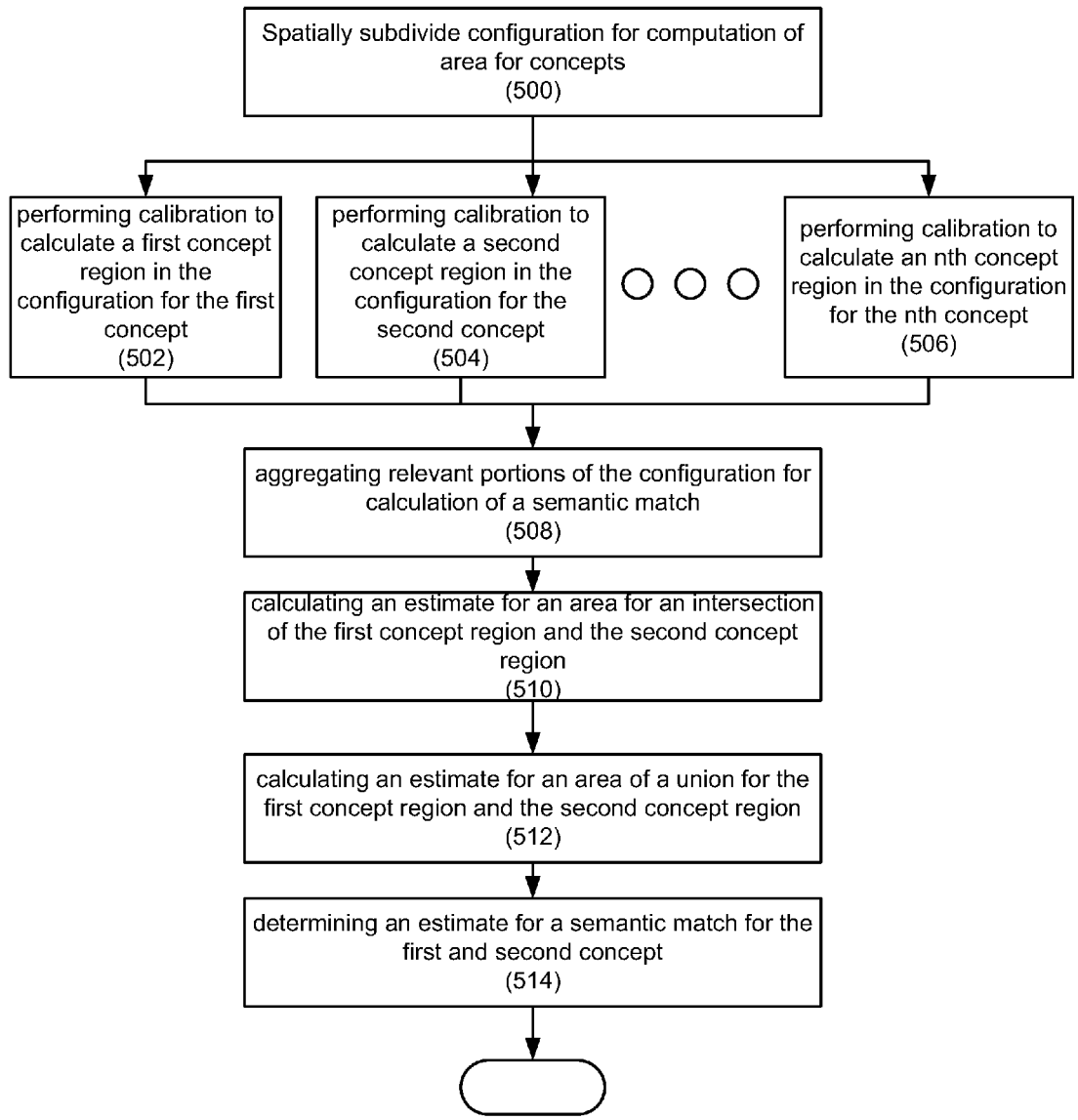
FIG. 5 is a detailed flow diagram illustrating an overview of a technique for semantic matching in an embodiment.

FIG. 5 is a detailed flow diagram illustrating an overview of a technique for semantic matching in an embodiment. In an embodiment, the configuration may be spatially subdivided for computation of the area of concepts (500). The metric space of the configuration may be subdivided into regions and the processing of the data within each of the regions may be performed in parallel, consecutively, and/or on different computer systems. In an embodiment, the processing of the data may be performed independently on a computer system. In another embodiment, the processing of the data for one region may depend on the processing of another region.

As illustrated, computation of the area is performed for 1 . . . N subdivisions. For example, computation for the area begins with performing calibration to calculate a first concept region in the configuration for the first concept (502), performing calibration to calculate a second concept region in the configuration for the second concept (504), and performing calibration to calculate an nth concept region in the configuration for the nth concept (506). Calibration may be used to calculate an area for each concept region. Calibration may be performed by a procedure that determines if a point in space, q, is in that region and then sampling the space (via a spatial subdivision algorithm) to estimate the region.

An example of computing the area is provided with the following pseudocode:

```
def location-is-in-region-of-concept (location q, configuration cfg, concept C):
    try adding an atom a* at location q, labeled C
    V_old ← V(old configuration cfg)
    V_new ← V(new configuration with a* added)
    ΔV ← | V_old – V_new |
    if ΔV is very large (with respect to only other atoms in concept C):
        remove a* and (since there is a nearby atom labeled C), return true
    else:
        return ΔV < ΔV_max
``` where the particular choice of $\Delta V_{max}$ determines the probability of an under generalization or over generalization. For example, if $\Delta V_{max}$ is too small, then there may be a large number of false negatives (e.g. locations that should have been considered part of the concept's region). Alternatively, if $\Delta V_{max}$ is too large, then a large number of false positives may result (e.g. locations that should not have been considered).

The relevant portions of the configuration for calculation of a semantic match may be aggregated (508). An estimate may be calculated for an area of intersection of the first concept region and the second concept region (510). For example, data for a first and second concept may be aggregated to determine the overlap of the regions. An estimate may be calculated for an area of union of the first concept region and the second concept region (512). An estimate may be determined for a semantic match for the first and second concept (514).

In one or more embodiments, new concepts may be created during pairwise similarity estimations of concepts. A clustering algorithm (either hierarchical or non-hierarchical) may be added to the pairwise similarity estimations to determine or predict new concepts by finding clusters of concepts. A new concept may be identified using a clustering algorithm where a cluster is found to be different (dissimilar) from one or more existing concepts. In an embodiment, the new concept may be identified where the cluster is found to be different from any existing concept or a specific number of concepts.

In an embodiment, a temporal sequence of increasingly precise approximations may be used to estimate the similarity between concepts. First, by way of explanation, consider the crudest approximation: looking only at the root node. If the ignored parts of the spatial regions are statistically independently distributed, then $$Pr[(A \cap B) \in n] = Pr[A \in n] \cdot Pr[B \in n]$$

similarly $$Pr[(A \cup B) \in n] = Pr[A \in n] \cdot Pr[B \in n] - Pr[A \in n] \cdot Pr[B \in n]$$

then, ignoring the children of the root node, $$\text{similarity}(C_1, C_2, \text{root}) = \frac{Pr[(C_1 \cap C_2) \in \text{root}]}{Pr[(C_1 \cap C_2) \in \text{root}]}$$

$$= \frac{Pr[C_1 \in \text{root}] \cdot Pr[C_2 \in \text{root}]}{Pr[C_1 \in \text{root}] + Pr[C_2 \in \text{root}] - Pr[C_1 \in \text{root}] \cdot Pr[C_2 \in \text{root}]}$$

is a first, crude, approximation to the exact value similarity $(C_1, C_2)$. A breadth-first search may be used that preferentially examines nodes in the configuration that are more likely to contain the concept from the semantic matching query.

Pseudocode for an example of an algorithm to find a semantic match is, as follows:

```
def  getSimilar(X):
     fringe[root] ← true
     fullyExploited[root] ← false
     soFar ← {} # contains pairs (C_i, Pr[C_i])

sorted by similarity (C_i, X) = area(C_1 ∩ C_2) / area(C_1 ∪ C_2)

def  refine():
     n ← root
     while fringe[n] and internal(n) and fullyExploited[n]:
         n ← best child n' of n (wrt Pr[ X ∈ n '] )
     if fringe[n] or leaf(n):
         return false # run out of nodes, done
     fringe[n] ← false
     for each child n' of n:
         fringe[n'] ← true
     if all children n' of n are either leaves or fullyExploited:
         fullyExploited[n] ← true
     merge children(n) into soFar
     return true
``` where fringe is the set of concepts that have not yet been explored.

The function refine( ) may be called repeatedly to update the set of concepts in soFar such that the best concepts and/or classes therein become increasingly similar to the query class and/or concept in the semantic match query, C. This algorithm may have one extra bit of storage in each node (e.g. indicating whether that node is on the current fringe) and another bit to indicate whether the subtree rooted at that node has been fullyExploited. The current set of results, soFar, can be maintained globally (which may not scale horizontally) or per sub-embedding (and these may be incrementally merged together at each fork to form the overall soFar).

In an embodiment, similarity of concepts may be determined using a probability that an instance of an individual concept is part of a class of concepts. For example, similarity (X,Y) may be computed by, first, defining the probability that any concept x in X can also be a member of concept Y (e.g. without increasing potential "too much"). The probability may be defined such that any concept x in Y can also be a member of concept X. Given this probability, an estimation of similarity may be defined as an estimate of these two probabilities. An example of a formula for the estimation is, as follows:

avg(Pr[x can have concept X added to it, for any concept x∈Y],
Pr[x can have concept Y added to it, for any concept x∈X])

In an embodiment, an assumption may be made that different concepts' potential functions do not overlap and an instance of a concept can also belong to a second, different concept without incurring a potential energy penalty (e.g. the Lennard-Jones model of the Pauli exclusion principle whereby, in a physical model, two atoms cannot share the same physical space). It may be desirable to ensure that the scalability (e.g. on multiple loosely-coupled computers) by noting that we can distribute this computation by, for each sub-volume of the space, counting the number of concepts that can have concept X added, and aggregate these counts (along with total count of atoms) to create a probability estimate for concept X over the entire volume.

That is,

```
def estimate-Pr[X→Y](volume V, configuration cfg, concept X, concept Y):
    (N_ok, N) ← estimate-Pr2[X→Y](V,cfg,X,Y)
    return N_ok/N
def estimatePr2[X→Y](volume V, configuration cfg, concept X, concept Y):
    if V is sufficiently small and simple:
        X-atoms ← {a ∈ V | a ∈ X }
        ok-X-atoms ← {a ∈ X-atoms | changeIsOK(cfg,a,Y) }
        return (|ok-X-atoms|, |X-atoms|)
    else:
        N_ok ← 0; N ← 0
        for each sub-volume V* in partition(V):
            (N_ok, N *) ← estimatePr2[X→Y](V*,cfg,X,Y)
            N_ok ← N_ok + N_ok
            N ← N + N *
        return (N_ok,N)
def changeIsOK(configuration cfg, atom a, concept X):
    cfg* ← copy of cfg, with concept X added to atom a
    V_1 ← V_{no X-X LJ repulsion}(cfg*)
    V_2 ← V(cfg)
    return |V_1−V_2| < ΔV_threshold
``` where $\Delta V_{threshold}$ is computed separately by choosing a threshold that provides an optimal tradeoff between type I and II errors as required for a particular problem. Note that Lennard Jones (L-J) repulsion is $\propto 1/r^6$ and so it may be flat at non-near distances; attraction is $\propto 1/r^{12}$ and enforces the non-overlap of L-J radii. Examples of Lennard-Jones model are provided in Lennard-Jones, J. E. (1924), "On the Determination of Molecular Fields", Proc. R. Soc. Lond. A 106 (738): 463-477) and Molecular Modelling: Principles and Applications (2nd Edition), Andrew Leach, Prentice Hall, ISBN 978-0582382107, p 207, both incorporated by reference herein. Type I and type II errors come from two-state classification problems: if we have a classifier that classifies things into two categories (e.g. "positive" and "negative"), then there are four possible outcomes in an embodiment of a classification: a true positive, a false positive, a true negative, and a false negative. Type I errors may be viewed as another name for false positives, and type II errors may be viewed as false negatives. Energy perturbation may be used as an indicator of concept inclusion, meaning that distances may be ignored (aside from short distances) so that the distance between two points becomes an approximation of the binary question of whether the two points are "too close".

Potential Energy Function

The potential energy function serves many purposes, including, but not limited to the following: (i) the function describes how ontological relations and similarity judgments are encoded, (ii) the function constrains the types of molecular dynamics/Monte Carlo simulations that are that are potentially required (and, hence, their solvability), (iii) the function provides the basis for the low-energy conformations that further provide the basis for calculating the similarity of concepts, and/or (iv) any combination thereof. In an embodiment, the potential energy function must satisfy purposes (i)-(iii).

By way of example, a potential energy function for one or more embodiments will be described. At any given point in time, the potential energy function is a summation of a large number of sub-potential functions; each sub-potential represents (in part or in whole) a subset of the input data: either ontological relations (such as disjointWith) or similarity judgments (including aggregations and sub-selections thereof).

In an embodiment, the sub-potential functions corresponding to concepts are layered, meaning that concepts belonging to concept X do not directly affect the momenta of concepts belonging to concept Y (where X≠Y). Nodes that belong to different concepts can most definitely affect each other indirectly: this is how we map ontological constraints and similarity judgments into a potential function. It may be desirable to view the notion of layering as invoking a metaphor of a Computer Aided Design (CAD) program where collections of objects can be manipulated in different layers independently of objects in other layers.

In an embodiment, intra-layer sub-potential energy functions are constructed on-the-fly, as follows: for each concept C, the following sub-potential functions are added to the overall potential function (which is a summation of all sub-potential functions):

$$V_{sub,C-C} = \sum_{atoms\ a,a',a!=a'} [a \in C][a' \in C]\frac{-1}{\|a-a'\|^2}$$

which is modeled after, in physical systems, the electrostatic interaction between two oppositely charged ions (Coulomb's law), where [true]=1 and [false]=0. Similarly, $$V_{sub,\neg C-\neg C} = \sum_{atoms\ a,a',a!=a'} [a \in \neg C][a' \in \neg C]\frac{-1}{\|a-a'\|^2}$$

$$V_{sub, C \to \neg C} = \sum_{atoms\ a,a'} [a \in \neg C][a' \in \neg C] \frac{-1}{\|a - a'\|^2}$$

Informally, these sub-potentials may be designed to ensure that concepts that belong to concept C will tend to group together in a globular fashion that minimizes volume (of the globule) and surface area. Concepts that belong to ¬C may tend to distribute themselves uniformly or nearly uniformly throughout the remainder of the space.

Even though there are sub-potential functions that define how ¬C concepts interact with other concepts (C concepts, ¬C concepts, other concepts), this embodiment may not require that all concepts have concepts corresponding to their negation in a configuration. That is, if for a concept C the concept ¬C is not used anywhere (in an ontological relation or a similarity judgment), then there may not need to be any ¬C concepts in the configuration.

In an embodiment, ontological relations may be reduced to sub-potential functions, as follows. By way of example, the relations subClassOf, disjointWith, negation, intersection and union are mapped and other ontological relations can similarly be mapped.

The ontological relation (subClassOf P C) means that every instance of concept C (the "child") is also in instance of the concept P (the "parent"). In the space of extensions of these concepts, there would be an expectation to see the extension of C being a strict subset of the extension of P. This may be achieved by designing a sub-potential function that makes concepts of concept C be attracted to concepts of concept P. Embodiments may not use potential functions that model physical reality (e.g. satisfying Newton's laws). (subClassOf P C) can be mapped into a sub-potential function:

$$V_{(subclass\ Of\ P\ C)}(a) = [a \in C] \sum_{atoms\ a', a'!=a} [a' \in P] \frac{-1}{\|a - a'\|^2}$$

where the notation V(a) is a simple way of denoting a part of a sub-potential that applies just to one concept, a.

The ontological relation (disjointWith X Y) may be interpreted as meaning that the extension of X and the extension of Y should not overlap. This may be achieved with the following sub-potential function:

$$V_{(disjointWith\ X\ Y)}() = \sum_{atoms\ a,a', a!=a'} [a \in X][a' \in Y] \frac{+1}{\|a - a'\|^2}$$

that says that concepts that are members of, respectively, to concepts X and Y are repulsed as if via an electrostatic interaction.

The ontological relation (intersection X Y C) is interpreted as meaning that instances of concept C are also instances of both concepts X and Y. This can be achieved in a different manner than with ontological relations such as subClassOf or disjointWith: rather than modifying the potential function, the labeling of concepts can be modified with concepts. That is, a configuration cfg can be modified to reflect the addition of the ontological relation (intersection X Y C) by doing the following:

for each concept a∈C in cfg:
add concept X to a, add concept Y to a this affects the global potential function by introducing inter-layer dependencies, effectively, in this case, saying that concepts that are members of concept C should behave as if they also belong to concept X and concept Y.

The ontological relation (union X Y C) is interpreted as meaning that instances of concept C are also instances of either concept X or concept Y. This can be achieved in a different manner than with ontological relations such as subClassOf or disjointWith: rather than modifying the potential function, we modify the labeling of concepts with concepts. That is, a configuration cfg can be modified to reflect the addition of the ontological relation (union X Y C) by doing the following:

for each concept a∈X in cfg:
add concept C to a
for each concept a∈Y in cfg:
add concept C to a this affects the global potential function by introducing inter-layer dependencies, effectively, in this case, saying that concepts that are instances of concept C should behave as if there are also either instances of concept X or instances of concept Y.

The ontological relation (negation C not-C) is interpreted as a renaming or aliasing: treat members of the concept not-C as also being members of the concept ¬C.

Similarity judgments (or soft constraints) can be interpreted as analogous to electrostatic interactions. An assumption can be made that similarity judgments are in the range $[-\infty \ldots +\infty]$ where negative judgments imply dissimilarity, positive judgments imply similarity and the degree of (dis)similarity is proportional to the absolute value of the similarity judgment. Note that other embodiments could assume other interpretations: for example, judgments could be in the range $[0,+\infty]$, $[0 \ldots 1]$, $[-1 \ldots 1]$ or any of a range of other possibilities.

Given a similarity judgment (similar X Y w) that means that concepts X and Y are judged to be similar with a degree w; and could be mapped, as follows:

$$V_{(similar\ X\ Y\ w)}() = \sum_{atoms\ a,a'} [a \in X][a' \in Y] \frac{-w}{\|a - a'\|^2}$$

In some embodiments, the potential energy function may be designed so that like or similar concepts cluster together, ideally forming one (or a small number) of globular regions. In such cases, globules have some volume, so any two concepts within that volume may have varying distances, which means that globules will have a maximum volume, or number of contained concepts. If dimensionality is too low, then for a given number of concepts, the average distance in the globule may be large enough that the average potential is still relatively high (e.g. the concepts cannot get close enough to be stable). In an n-dimensional metric space, a point is defined by n numbers. So, in a two dimensional space, a point is defined by two numbers (interpreted, for example, in a Euclidean space as multiplicative factors on each if there are a set of basis vectors) If there are many concepts then the only way to get stable configurations may be to increase dimensionality. In some embodiments, the ability to change the dimensionality may increase the ability to find stable, low-energy configurations, thereby helping find configurations that accurately estimate a solution to the given set of constraints.

Versioning of Ontologies

In an embodiment, differences between different versions of an ontology may be determined and/or displayed or highlighted. If provided with at least two ontologies that represent different versions of the same ontology, such that each ontology is describing the same concepts and uses the same names for the (intended) same concepts, semantic matching may be used to display differences between the versions of the ontologies. Using semantic matching, a similarity estimator may be built for combining a plurality of ontologies and displaying the most-similar and most-different concepts in the different versions. This provides a way of highlighting changes between versions of a large ontology without having to browse through a large number of concepts.

Quality Assurance

Pairwise similarity estimation can be used to discover empty concepts (concepts with an empty extension) by computing the similarity between the given concept, C, and the concept ¬Empty where Empty is a concept with no members. In an embodiment, this could get mapped into a configuration in which no atoms are labelled Empty.

Search

With a target concept, semantic matching can be used to determine a sequence of concepts ordered by decreasing similarity to the target concept. In an embodiment, search can be performed using (a) pair-wise similarity of concepts; and (b) an index that maps concepts to members thereof by using pairwise similarity to query the index and find a collection of concepts that are similar to the target concept.

System Overview

Figure 6:
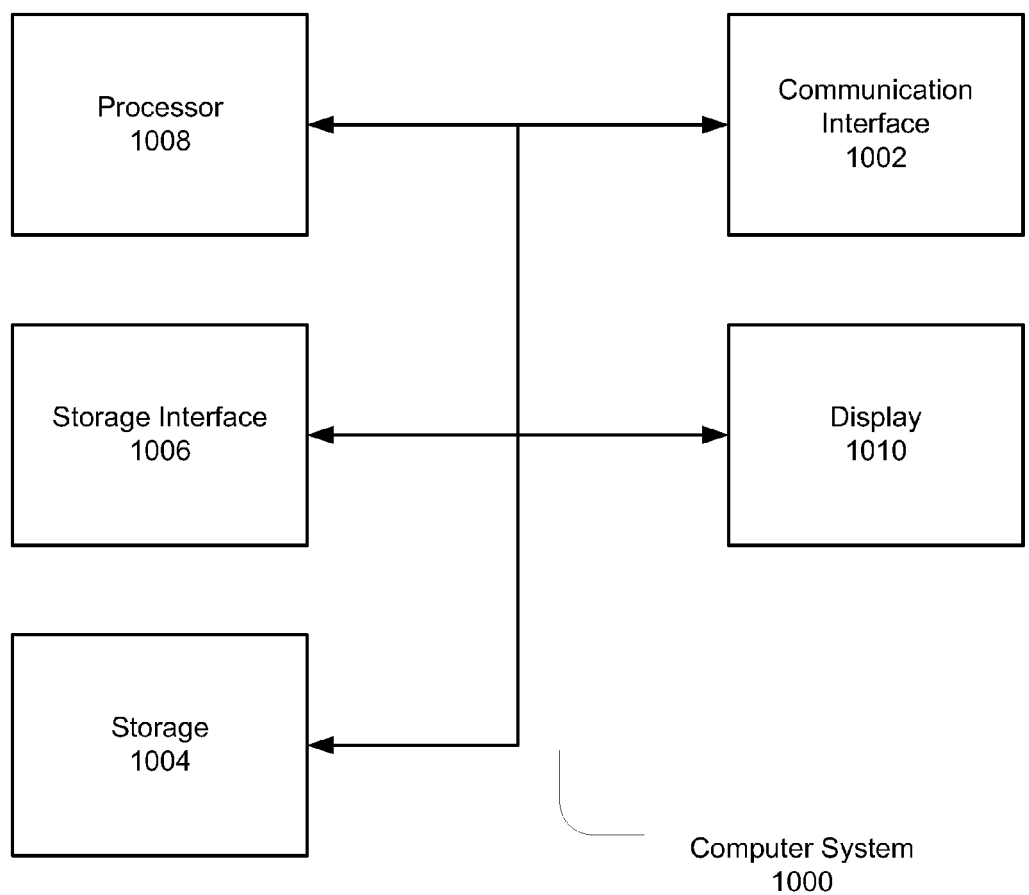
FIG. 6 illustrates a block diagram of an example of an environment wherein semantic matching might be used.

FIG. 6 illustrates a block diagram of an example of an architecture of a computing system for a computing environment wherein semantic matching might be used. The execution of instructions to practice the invention may be performed by any number of computer systems 1000. As used herein, the term computer system is broadly used to describe any computing device that can store and independently run one or more programs, applications, scripts, or software processes. Implementations of the present invention may have a single computer system 1000 or any number of computer systems 1000.

Computer systems 1000 may communicate with other computer systems/devices using any number of Communication Interface(s) 1002. The Communication Interface 1002 may provide the ability to transmit and receive signals, such as electrical, electromagnetic or optical signals, that include data streams representing various types of information (e.g., messages, communications, instructions, and data). The Communication Interface 1002 may provide an implementation for a communication protocol, such as a network protocol. Instructions may be executed by a Processor 1008 upon receipt and/or stored in Storage 1004 accessible to the Computer System 1000.

Storage 1004 may be accessed by the Computer System 1000 with a Storage Interface 1006. The Computer System 1000 may use the Storage Interface 1006 to communicate with the Storage 1004. The Storage Interface 1006 may include a bus coupled to the storage and able to transmit and receive signals. Storage 1004 may include random access memory (RAM) or other dynamic storage devices, for storing dynamic data and instructions executed by the Processor 1008. Any number of Processor(s) 1008 may be used to execute instructions for the Computer System 1000. Storage may include, but is not limited to, read only memory (ROM), magnetic disks, flash drives, USB drives, and optical disks. In one or more embodiments, a Computer System 1000 may be connected to a Display 1010 for displaying information to a user.

"Computer usable medium," "Machine-readable medium," or "Computer-readable medium" refers to any medium that provides information or may be used by a Processor 1008. Mediums may include volatile and non-volatile storage mediums.

Various embodiments of the present invention may be implemented with the aid of computer-implemented processes or methods (e.g. programs or routines) that may be rendered in any computer language including, without limitation, C#, C/C++, Fortran, COBOL, PASCAL, Ruby, Python, Perl, assembly language, markup languages (e.g., HTML, SGML, XML, VoXML), and the like, as well as object-oriented environments such as the Common Object Request Broker Architecture (CORBA), Java™ and the like.

In view of the above, it should be appreciated that some portions of this detailed description are presented in terms of algorithms and symbolic representations of operations on data within a computer memory. These algorithmic descriptions and representations are the means used by those skilled in the computer science arts to most effectively convey the substance of their work to others skilled in the art. An algorithm is a sequence of steps leading to a desired result. The steps are those requiring physical manipulations of physical quantities. These quantities may take the form of electrical or magnetic signals capable of being stored, transferred, combined, compared and otherwise manipulated. The signals include, but are not limited to, bits, values, elements, symbols, characters, terms, or numbers.

Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments can be implemented with an apparatus to perform the operations described herein. This apparatus may be specially constructed for the required purposes, or it may comprise a general-purpose computer, selectively activated or reconfigured by a computer program stored in the computer. The computer program may be stored in a computer-readable storage medium or computer program product, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Various general-purpose systems may be used with programs in accordance with the teachings herein, or it may prove convenient to construct more specialized apparatus to perform the required method. For example, any of the methods according to the present invention can be implemented in hard-wired circuitry by programming a general-purpose processor or by any combination of hardware and software. One of ordinary skill in the art will immediately appreciate that the invention can be practiced with computer system configurations other than those described, including hand-held devices, multiprocessor systems, microprocessor-based or programmable consumer electronics. DSP devices, minicomputers, mainframe computers, or other systems. Embodiments may use distributed computing environments where tasks are performed by one or more remote processing devices that are linked through a communications network.

While certain exemplary embodiments have been described and shown in the accompanying drawings, it is to be understood that such embodiments are merely illustrative and not restrictive, and that this invention is not restricted to the specific constructions and arrangements shown and described since modifications may occur to those ordinarily skilled in the art. The above detailed description is of a small number of embodiments for implementing the invention and is not intended to be limiting in scope. One of skill in this art will immediately envisage the methods and variations used to implement this invention in other areas than those described in detail.

The following claims set forth a number of the embodiments of the invention disclosed with greater particularity. Any suitable programming language can be used to implement the routines of particular embodiments including C, C++, Java, assembly language, etc. Different programming techniques can be employed, such as procedural or object oriented. The techniques can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor may include a system with a general-purpose central processing unit, multiple processing units, dedicated circuitry for achieving functionality, or any other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, modification, various changes, and substitutions are intended in the foregoing disclosures, and it will be appreciated that in some instances some features of particular embodiments may be used without a corresponding use of other features without departing from the scope and spirit as set forth. Those with skill in the art will recognize that modifications may be made to adapt a particular situation or material to the essential scope and spirit.

The invention claimed is:

1. A method for semantic matching performed by one or more processors, the method comprising:

representing, using the one or more processors, concepts in one or more ontologies as a configuration, with the configuration representing the concepts as having a set of contiguous positions in a metric space, with a concept being a cognitive unit of meaning and with each concept having an area in the metric space;

calculating, using the one or more processors, an estimate of an area of intersection between a first concept and a second concept in a pair of concepts and calculating, using the one or more processors, an estimate for an area of union for the first concept and the second concept to perform, similarity judgments between pairs of concepts in the configuration to assign judgment values, where negative judgment values imply dissimilarity and positive judgment values imply similarity between a pair of concepts, with a value of a similarity judgment being the ratio of common area in the metric space between two concepts to the combined/total area of the two concepts;

initially positioning, using the one or more processors, concepts in the metric space to reflect anticipated similarity judgments between the concepts;

employing, across one or more processors, a potential energy function to model the initial similarity judgments and a large number of constraints, represented by ontologies, as a part of the configuration;

assigning, using the one or more processors, potential energy values to pairs of concepts in the configuration with a lower potential energy absolute value assigned to pairs of concepts separated by a large distance and a higher potential energy absolute value assigned to pairs of concepts separated by a small distance;

scaling, using the one or more processors, each potential energy value of a pair of concepts in the configuration by a factor proportional to the negative of the judgment value between the pair of concepts, where a negative potential energy value implies that the first and second concepts attract and a positive potential energy value implies that the first and second concepts repel;

optimizing, using the one or more processors, the configuration to minimize potential energy of the concepts in the configuration by adjusting the positions between concepts in the metric space to minimize the potential energy as calculated by a molecular dynamics potential energy minimization function;

using spatial subdivision of the metric space, across one or more small computers, and grouping relatively closely located concepts in a same subdivision to distribute processing of large number of concepts across the one or more small computers to achieve "cloud" scale; and in response to user input requesting a second concept semantically similar to a first concept, outputting, using the one or more processors, a second concept where the ratio of overlap of the areas of the first and second concepts to the combined areas of the first and second concepts is a maximum.

2. The method of claim 1 where:

representing concepts further comprises receiving, with the one or more processors, information on at least a portion of an ontology from the one or more ontologies;

assigning a higher or lower potential energy further comprises assigning, with the one or more processors, at least one of a momentum and a location to a concept in accordance with the information; and where optimizing further comprises optimizing, with the one or more processors, the configuration by at least one of adjusting a position for the first concept and adjusting a relationship between the first concept and another concept within the configuration in accordance with the information.

3. The method of claim 1 wherein optimizing the configuration further comprises:

performing, with the one or more processors, an analysis on each pair of concepts in the configuration, wherein the analysis comprises at least one of solving one or more partial differential equations and performing a simulation; and adjusting, with the one or more processors, the configuration to minimize any number of conflicts by satisfying one or more constraints for each pair of concepts.

4. The method of claim 1 further comprising:

spatially subdividing, with the one or more processors, the configuration into one or more subdivisions; and performing calibration, with the one or more processors, on a first subdivision to determine an area for the first concept.

5. The method of claim 1 wherein performing similarity judgments is performed by at least one of crowd sourcing, recording, with the one or more processors, a behavioral judgment, using a histogram, and using a heuristic.

6. The method of claim 1 further comprising:

determining, with the one or more processors, a new concept by combining one or more concepts within the configuration.

7. The method of claim 1 wherein a concept is at least one of a class of concepts and an individual concept.

8. The method of claim 1 further comprising:

calculating, with the one or more processors, an estimate by sampling conditional probabilities of a first concept being compatible with a second concept.

9. A non-transitory computer readable medium having one or more instructions thereon for semantic matching, the instructions when executed by one or more processors causing the one or more processors to perform the acts of:

representing concepts in one or more ontologies as a configuration, with the configuration representing the concepts as having a set of contiguous positions in a metric space, with a concept being a cognitive unit of meaning and with each concept having an area in the metric space;

calculating an estimate of an area of intersection between a first concept and a second concept in a pair of concepts and an estimate for an area of union for the first concept and the second concept to perform similarity judgments between pairs of concepts in the configuration to assign judgment values, where negative judgment values imply dissimilarity and positive judgment values imply similarity between a pair of concepts, with a value of a similarity judgment being the ratio of common area in the metric space between two concepts to the combined/total area of the two concepts;

initially positioning concepts in the metric space to reflect anticipated similarity judgments between the concepts;

employing a potential energy function to model the initial similarity judgments and a large number of constraints, represented by ontologies, as a part of the configuration assigning potential energy values to pairs of concepts in the configuration with a lower potential energy absolute value assigned to pairs of concepts separated by a large distance and a higher potential energy absolute value assigned to pairs of concepts separated by a small distance;

scaling each potential energy value of a pair of concepts in the configuration by a factor proportional to the negative of the judgment value between the pair of concepts, where a negative potential energy value implies that the first and second concepts attract and a positive potential energy value implies that the first and second concepts repel;

optimizing the configuration to minimize potential energy of the concepts in the configuration by adjusting the positions between concepts in the metric space to minimize the potential energy as calculated by a molecular dynamics potential energy minimization function;

using spatial subdivision of the metric space, across one or more small computers, and grouping relatively closely located concepts in a same subdivision to distribute processing of large number of concepts across the one or more small computers to achieve "cloud" scale; and in response to user input requesting a second concept semantically similar to a first concept, outputting a second concept where the ratio of an overlap of the areas of the first and second concepts to the combined areas of the first and second concepts is a maximum.

10. The non-transitory computer readable medium of claim 9 wherein a concept is at least one of a class of concepts and an individual concept.

11. The non-transitory computer readable medium of claim 9 with the instructions when executed by one or more processors causing the one or more processors to further carry out:

receiving information on at least a portion of an ontology from the one or more ontologies;

assigning at least one of a momentum and a location to a concept in accordance with the information; and optimizing the configuration by at least one of adjusting a position for the first concept and adjusting a relationship between the first concept and another concept within the configuration in accordance with the information.

12. The non-transitory computer readable medium of claim 9 with the instructions when executed by one or more processors causing the one or more processors to further carry out:

performing an analysis on each pair of concepts in the configuration, wherein the analysis comprises at least one of solving one or more partial differential equations and performing a simulation; and adjusting the configuration to minimize any number of conflicts with satisfying one or more constraints for each pair of concepts.

13. The non-transitory computer readable medium of claim 9 with the instructions when executed by one or more processors causing the one or more processors to further carry out:
spatially subdividing the configuration into one or more subdivisions; and performing calibration on a first subdivision to determine an area for the first concept.

14. The non-transitory computer readable medium of claim 9 wherein performing similarity judgments is performed by at least one of crowd sourcing, recording a behavioral judgment, using a histogram, and using a heuristic.

15. The non-transitory computer readable medium of claim 9 with the instructions when executed by one or more processors causing the one or more processors to further carry out:
calculating an estimate by sampling conditional probabilities of a first concept being compatible with a second concept.

16. A system for semantic matching, comprising:
a processor operable to execute a set of instructions; and
a non-transitory computer readable medium in communication with the processor, the computer readable medium operable to store a set of instructions, wherein the set of instructions are configured to:
represent concepts in one or more ontologies as a configuration of concepts, with the configuration representing the concepts as having a set of contiguous positions in a metric space, with a concept being a cognitive unit of meaning and with each concept having an area in the metric space;
calculating an estimate of an area of intersection between a first concept and a second concept in a pair of concepts and an estimate for an area of union for the first concept and the second concept to perform similarity judgments between pairs of concepts in the configuration to assign judgment values, where negative judgment values imply dissimilarity and positive judgment values imply similarity between a pair of concepts, with a value of a similarity judgment being the ratio of common area in the metric space between two concepts to the combined/total area of the two concepts; initially position concepts in the metric space to reflect anticipated similarity judgments between the concepts;
employ a potential energy function to model the initial similarity judgments and a large number of constraints, represented by ontologies, as a part of the configuration assign potential energy values to pairs of concepts in the configuration with a lower potential energy absolute value assigned to pairs of concepts separated by a large distance and a higher potential energy absolute value assigned to pairs of concepts separated by a small distance;
scale each potential energy value of a pair of concepts in the configuration by a factor proportional to the negative of the judgment value between the pair of concepts, where a negative potential energy value implies that the first and second concepts attract and a positive potential energy value implies that the first and second concepts repel;
optimize the configuration to minimize potential energy of the concepts in the configuration by adjusting the positions between concepts in the metric space to minimize the potential energy as calculated by a molecular dynamics potential energy minimization function;
use spatial subdivision of the metric space, across one or more small computers, and grouping relatively closely located concepts in a same subdivision to distribute processing of large number of concepts across the one or more small computers to achieve "cloud" scale; and
in response to user input requesting a second concept semantically similar to a first concept, output a second concept where the ratio of an overlap of the areas of the first and second concepts to the combined areas of the first and second concepts is a maximum.

17. The system of claim 16 wherein the concept is at least one of a class of concepts and an individual concept.

18. The system of claim 16 wherein the set of instructions are further configured to:
receive information on at least a portion of an ontology from the one or more ontologies;
assign at least one of a momentum and a location to a concept in accordance with the information; and
optimize the configuration by at least one of adjusting a position for the first concept and adjusting a relationship between the first concept and another concept within the configuration in accordance with the information.

* * * * *